United States Patent [19]

Varner

[11] 3,864,116
[45] Feb. 4, 1975

[54] SELECTIVE TROPICAL CROP HERBICIDES
[75] Inventor: Reed W. Varner, Wilmington, Del.
[73] Assignee: E. I. Du Pont de Nemours and Company, Wilmington, Del.
[22] Filed: Feb. 23, 1973
[21] Appl. No.: 335,117

[52] U.S. Cl. .................................................. 71/92
[51] Int. Cl. .............................................. A01n 9/22
[58] Field of Search ........................................ 71/92

[56] References Cited
UNITED STATES PATENTS
3,235,357   2/1966   Loux ........................................ 71/92

Primary Examiner—Lewis Gotts
Assistant Examiner—Catherine L. Mills

[57] ABSTRACT

5-Chloro-6-methyl-3-neopentyluracil and 5-bromo-6-methyl-3-neopentyluracil are good selective herbicides, which control many weeds in certain crops such as grapes, tea, coffee, sugarcane, citrus, oil palm, and bananas.

10 Claims, No Drawings

SELECTIVE TROPICAL CROP HERBICIDES

BACKGROUND OF THE INVENTION

U.S. Pats. Nos. 3,235,357 and 3,352,862 disclose that many uracils have herbicidal activity. Several of the uracils disclosed in those patents have found commercial utility as total herbicides.

However, an important area for herbicides is in the selective control of weeds in various crops. For example, herbicides used in the presence of crops growing in tropical climates, under high rainfall conditions, should maintain their activity without being leached out during the rain season. Otherwise, the herbicide application would have to be repeated at frequent intervals. A herbicide that can effectively control weeds in crops such as tea, coffee, oil palm, sugarcane, grapes, citrus and bananas without injuring the crop is particularly desirable.

SUMMARY OF THE INVENTION

According to the present invention, it has now been found that 5-chloro-6-methyl-3-neopentyluracil and 5-bromo-6-methyl-3-neopentyluracil are very effective selective herbicides which control weeds in the presence of the above tropical crops, especially under high rainfall conditions.

DESCRIPTION OF THE INVENTION

The compounds of the present invention have the following structure:

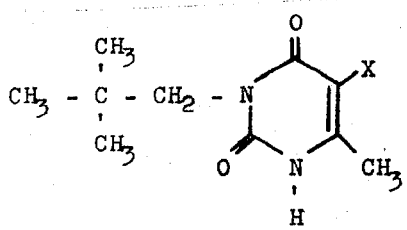

wherein X is chlorine or bromine.

These compounds can be made, for example, as described in the following examples, wherein all parts, proportions, and percentages are by weight unless otherwise indicated.

EXAMPLE 1

A. 6-Methyl-3-neopentyluracil

To 201 parts of distilled water was added 87 parts of neopentylamine at 25°-30°C. After adding 50 parts of 98% sulfuric acid with cooling to 25°-30°C, 71.5 parts of sodium cyanate (10% molar excess) was added to the resulting slurry. Additional 60 parts of water was next added and the mixture was heated to 80°C with good agitation and held at that temperature for 1 hour. The slurry was cooled to 25°C, filtered, and reslurried with 150 parts of distilled water. The resulting solids were washed with additional 45 parts of distilled water. After drying, 118 parts of neopentylurea was obtained.

To these 118 parts of neopentylurea there was added 113 parts of methyl acetoacetate, 162 parts of xylene, and 0.62 part of concentrated sulfuric acid. Water was then removed by refluxing the mixture at 80°C and 85 mm Hg and trapping water in the condensate. Reflux was continued under these conditions for 13 hours during which a total of 15.5 parts of water phase was collected. A previously made mixture of 52 parts of sodium methylate and 143 parts of methanol was then added at 71°-77°C. The reacting mixture was allowed to remain standing overnight with gentle agitation, then heated to reflux, while the condensate was drawn off continuously until the temperature of the reacting mixture rose to 84°C. The total distillate withdrawn was 178 parts. The distillation residue was then extracted with 435 parts of distilled water. To the aqueous phase was added additional 193 parts of distilled water, and the pH of the mixture was adjusted to 5.5 with 40 parts of concentrated sulfuric acid. The resulting slurry was filtered, washed with water, and dried, yielding 136 parts of 6-methyl-3-neopentyluracil, m.p. 182°-183.5°C.

B. 5-Chloro-6-methyl-3-neopentyluracil

The above 136 parts of 6-methyl-3-neopentyluracil was mixed with 985 parts of distilled water and 63.5 parts of 50% sodium hydroxide, and to this mixture was added over 3 hours at 38°-40°C and with good agitation 1065 parts of a sodium hypochlorite solution containing 5.5% of available chlorine. The resulting slurry was filtered, washed and dried under vacuum at 80°-90°C, yielding 128 parts of 5-chloro-6-methyl-3-neopentyluracil, m.p. 244.5°-246°C.

EXAMPLE 2

5-Bromo-6-methyl-3-neopentyluracil

One hundred and ninety-six parts 6-methyl-3-neopentyluracil was dissolved in 2500 parts of methylene chloride, and 160 parts of bromine was added slowly with stirring and external cooling. The resulting solution was taken to dryness, and the residue was recrystallized from nitromethane, yielding 5-bromo-6-methyl-3-neopentyluracil, m.p. 247°-250°C.

The rate of application to the locus of the crops depends upon many factors such as soil type, method of application, etc. The compounds can be applied pre- or post-emergence to the weeds but as a directed post-emergence treatment to the crops. For most crops caution should be taken not to treat the crop foliage. The treatment should be applied as uniformly as possible, and thorough coverage of the weeds is essential in post-emergence spray applications. Postemergence applications are more effective when applied with a surfactant such as trimethyl nonyl polyethylene glycol ether.

Proper application of this compound results in good control of many serious and troublesome weeds. Some of the many different weed species controlled are wild turnip (*Brassica Campestris*), common ragweed, (*Ambrosia artemisifolia*), common crabgrass (*Digitaria sanguinalis*), field bindweed (*Convolvulus arvensis*), foxtail (*Setaria sp.*), pigweed (*Amaranthus sp.*), Florida beggarweed (*Besmodium tortuosum*), cocklebur (*Xanthium pennsylvanicum*), morningglory (*Ipomoea sp.*), carpetweed (*Mollugo verticillata*), smartweed (*Polygonum sp.*), goosegrass (*Eleusine indica*), curly dock (*Rumex crispus*), Johnsongrass (*Sorghum halepense*), burning nettle (*Urtica urens*), common yarrow (*Achillea millefolium*), chicory (*Cichorium intybus*), guineagrass (*Panicum maximum*), purslane (*Portulaca oleracea*), barnyardgrass (*Echinochloa crusgalli*), dallisgrass (*Paspalum dilatatum*), catsear (*Hypochaeris sp.*), chickweed (*Stellaria media*), goldenrod (*Solidago sp.*), darnel (*Lolium temulentum*), smooth crabgrass (*Digitaria ischaemum*), coffee senna (*Cassia occidentalis*), and nutsedge (*Cyperus sp.*). Of particular interest in the high activity of the compounds of the invention on pigweed (*Amaranthus sp.*) and nutsedge (*Cyperus sp.*)

The compounds of this invention are particularly useful as herbicides under high rainfall conditions. Their low water solubility and resistance to leaching from the upper soil layer enable them to provide extended weed control under conditions that move many herbicides so deeply into the soil that they no longer control weed seedlings growing on the surface. This severe leaching can cause many herbicides to give poor weed control and crop injury at the same time. Under those conditions, the instant uracils give outstanding results without injury to a number of crops, including sugarcane, pineapple, tea, banana, and oil palm.

These uracils may be advantageously combined with other herbicides such as various substituted ureas, triazines and other uracils to give a broader spectrum of herbicidal activity, extended weed control, added crop safety or other benefits.

COMPOSITIONS

The uracils of this invention can be formulated for use with adjuvants such as inert solid diluents, liquid carriers and surfactants.

The amount of herbicide in such preparations can vary over a wide range according to need. Such amounts will be called herbicidally effective amounts. Generally speaking, the formulations will contain from about 0.5 to 95%, by weight of the uracil.

Powdered or dust compositions of the invention, whether or not also modified with a surface-active agent, are prepared by mixing the active ingredient with finely divided inert solid carriers such as talcs, natural clays, pyrophyllite, diatomaceous earth, and flours such as walnut shell, wheat, redwood, soya bean, and cottonseed. Other inert solid carriers can be used. The preferred diluents are attapulgite clay, montmorillonite clay, kaolinites and synthetic silicas and silicates.

Wettable powders are compositions which usually contain inert solid diluents in addition to surfactants. Wettable powders will normally contain both a wetter and a dispersant. Most preferred for dry wettable powders are solid anionic and nonionic surfactants. Occasionally, a liquid, nonionic surfactant, normally considered an emulsifying agent, can be used to produce both wetting and dispersion.

Wetting and dispersing agents in wettable powders of this invention, when taken together, will comprise from about 0.5 weight percent to 5.0 weight percent of the total composition. The active component will be present at a concentration of from about 20 to 90%, and diluent makes up the balance to 100%. Where needed, a corrosion inhibitor or forming inhibitor may be added at rates of 0.1% to 1.0% with a corresponding reduction in diluent.

Dust compositions are those intended for application in dry form with suitable dusting equipment. Since wind drift is undesirable when applying dusts, the most suitable dust diluents are those which are dense and rapid settling. A wetting agent may be desirable in dust formulations, so that adhesion to dew-covered foliage is enhanced. Dusts made from wettable powders will usually contain sufficient wetter, but dusts made directly from unformulated active ingredient would require an added wetting agent. Dry solid anionic or nonionic wetters are preferred.

Dust formulations will normally contain from 0.5 weight percent to 25 weight percent of active material; however, dust concentrates containing 50 to 95 percent of active material are useful.

The term "surfactant or surface-active agent" is intended to include wetting agents, dispersing agents, suspending agents and emulsifying agents. Surface-active agents suitable for use are set forth in "Detergents and Emulsifiers 1972 Annual", John W. McCutcheon, Inc., Morristown, New Jersey. The preferred surfactants include sodium alkylnaphthalenesulfonates, sodium alkylbenzenesulfonates, dioctyl sodium sulfosuccinate and sodium laurylsulfate, methylated cellulose, and sodium, calcium or ammonium lignin sulfonates.

Granule or pellet compositions can be prepared by mixing the active material in finely divided form with clays (with or without water soluble binders), moistening the mixture with 15–20% water, extruding the mass under pressure through an orifice, then cutting the extrusions to size before drying to yield pellets or first drying, then granulating to yield granules. Similarly, the finely divided premix can be granulated by trumbling while applying water or a binder solution. Alternatively, granules can be made by spraying active material in solution or suspension upon the surface of a preformed granule of clay, vermiculite, or other suitable granular material. The percentage of the active ingredient may vary from 1–80% but is usually 3–25% of the herbicidal composition.

Liquid herbicidal compositions of this invention can be prepared by dispersing the active ingredient in an aqueous or inert nonaqueous carrier or by dissolving it in a suitable solvent. Suitable solvents are water-immiscible ethers, esters, ketones and the like. Among nonsolvent carriers water is preferred; aqueous, as well as oil dispersions are prepared by milling the uracils with dispersing agents and suspending agents and inert carriers. The amount of the herbicide in the dispersion usually is from 10% or less to 50% of the aqueous or oil dispersion.

The particles in such dispersions may range from about 0.1 to 50 microns although the majority are preferably in the range of from about 0.5–10 microns in average diameters. Most frequently, the oils used are aliphatic hydrocarbons and mixtures thereof, particularly those derived from petroleum and having a boiling point in the range from about 125° to 400°C. Such compositions may be converted into emulsifiable oils by addition of a surfactant. Suitable surfactants are those anionic or nonionic agents known to the art as emulsifying agents. Emulsifying agents most suitable for the compositions of this invention are alkyl and alkylaryl polyethoxy alcohols, polyoxyethylene sorbitol or sorbitan fatty acid esters, polyethylene glycol fatty esters, fatty alkylol amide condensates, amine salts of fatty alcohol sulfates plus long chain alcohols, and oil soluble petroleum sulfonates. Such emulsifying agents will comprise from about 2–10 weight percent of the total composition.

While conventional applications of sprayable formulations have usually been made in dilute form (for example, at a rate of about 200 liters per hectare or more), the compounds of this invention can also be applied at higher concentrations in typical "ultra-low-volume" or "low-volume" applications from aircraft or ground sprayers. For this purpose wettable powders can be dispersed in small amounts of aqueous or non-aqueous carrier. Particularly suitable are solutions or finely divided suspensions in one or more carrier such as dialkylformamides, N-alkylpyrrolidones, dimethyl sulfoxide, water, esters, ketones, glycols, glycol ethers and the like. Other suitable carriers include aromatic hydrocarbons (halogenated and nonhalogenated), aliphatic hydrocarbons (halogenated and non-halogenated), and the like.

The salts of the uracils of this invention are especially advantageous for use as herbicides because they are soluble in water and can be applied as aqueous solutions. Since these uracils are weak acids, they can be brought into solution in water by strong bases; yet, because of the buffering properties of the soil, these salts readily revert to the free uracils, once they have been applied to the locus of the weeds. Bases having a pH of at least 10.5 in a 1% aqueous solution, such as lithium, sodium or potassium phosphates, silicates, borates, oxides or hydroxides, are suitable solubilizing, salt forming agents for this purpose. The preparations can contain from 0.5 to 80% active ingredient and from 5 to 99.5% of the solubilizing agent. Formulations of these salts can also be prepared in the form of solids or solutions of the salts in hydroxylated solvents such as alcohols, glycols, etc.

It has also been found that preparation with polar low-molecular weight amines, such as ethanolamines, propanolamines and butanolamines gives addition compounds of the uracil soluble in water, especially when the amine is present in excess. Other amines, such as piperidine and octanolamines give addition compounds which are soluble in both water (with an excess of amine present) and selected hydrocarbon solvents. At the other end of the scale, amines such as dodecylamine, cocoamine, and tallowamine give the addition compounds high hydrocarbon solubility.

Thus, it is apparent that by properly selecting an amine and forming an addition compound with it, the active compounds can be formulated as an aqueous solution, wettable powder, or as an oil-emulsifiable or oil-extendable formulation. In this way, the nitrogenous base-addition compounds give formulation and application advantages, while still maintaining the desirable herbicidal characteristics of the instant uracils.

The uracils of this invention can also be formulated to contain other herbicides to give compositions which have advantages over the individual components.

Among the known herbicides which can be combined with the uracil of the invention are:

| | Weight ratio of other herbicide to 5-chloro-6-methyl-3-neopentyluracil or 5-bromo-6-methyl-3-neopentyluracil |
|---|---|
| atrazine | 1:10 to 10:1 |
| linuron | 1:10 to 10:1 |
| paraquat | 1:5 to 20:1 |
| diuron | 1:5 to 10:1 |

The uracils of this invention can be formulated and applied, for example, in the following ways. All parts and percentages are by weight.

EXAMPLE 3

| Wettable Powders | Percent |
|---|---|
| 5-Chloro-6-methyl-3-neopentyluracil | 80.0 |
| Sodium lauryl sulfate | 0.6 |
| Sodium ligninsulfonate | 2.0 |
| Kaolin clay | 17.4 |

These components are blended and hammer-milled until the solids are substantially all below 50 microns in particle size. The mixture is then reblended until it is homogeneous.

The above formulation was applied as a water spray at the rates indicated below to 30 year old tea growing in a clay loam with 13% organic matter. (Diuron was included in the test as a standard for comparison). Application was made July 10 and the data below were taken August 30. The results are shown in the table below:

| Product | Kg/Ha | Crabgrass | | Nutsedge | | Others | | Broad leaves | | Total weeds present, % of check | |
|---|---|---|---|---|---|---|---|---|---|---|---|
| | | N* | W** | N | W | N | W | N | W | N | W |
| 5-chloro-6-methy-3-neopentyluracil 80WP | 2.2 | 0 | 0 | 0 | 0 | 0 | 0 | 0 | 0 | 0 | 0 |
|  | 4.4 | 0 | 0 | 0 | 0 | 0 | 0 | 0 | 0 | 0 | 0 |
|  | 8.8 | 0 | 0 | 0 | 0 | 0 | 0 | 0 | 0 | 0 | 0 |
| Diuron 80WP | 2.9 | 8 | 3.87 | 4 | 0.03 | 0 | 0 | 4 | 0.03 | 11 | 5 |
| Check | — | 81 | 80.80 | 24 | 2.28 | 1 | 0.01 | 24 | 2.28 | 100 | 100 |

*Numbers/m².
**Dry weight (g)/m².

EXAMPLE 4

| Wettable Powders | Percent |
|---|---|
| 5-Bromo-6-methyl-3-neopentyluracil | 80.0 |
| Dioctyl sodium sulfosuccinate concreted with sodium benzoate (Aerosol OTB) | 2.5 |
| Partially desulfonated sodium lignin sulfonate (Marasperse CB) | 1.5 |
| Alkylnaphthalene sulfonate ("Alkanol B") | 3.0 |
| Basic magnesium carbonate | 2.0 |
| Attapulgite | 9.0 |
| Fine silica | 2.0 |

This powder is prepared as in Example 3, above.

Three kilograms of the above wettable powder formulation can be suspended in 400 liters of water and applied as a directed postemergence spray treatment to a hectare of citrus. Care is taken not to wet the citrus foliage. Thorough coverage of the weed foliage is essential. This treatment provides good control of the weeds present.

EXAMPLE 5

A wettable powder can be prepared by blending the following components in a ribbon blender, then hammermilling them until substantially all the particles are below 50 microns in size, and then reblending until homogeneous.

| | Percent |
|---|---|
| 5-Bromo-6-methyl-3-neopentyluracil | 25 |
| Kaolin clay | 70 |
| Dioctyl sodium sulfosuccinate | 1 |
| Sodium ligninsulfonate | 4 |

This formulation can be applied as a directed post-emergence spray treatment at a rate of 4 kilograms per hectare to tea. The formulation should be applied in enough water to insure adequate coverage.

EXAMPLE 6

| | Percent |
|---|---|
| 5-Bromo-6-methyl-3-neopentyluracil | 50 |
| Kaolin clay | 48 |
| Dioctyl sodium sulfosuccinate | 1 |
| Sodium ligninsulfonate | 1 |

These ingredients are mixed together in a ribbon blender, then hammer-milled and ground in an air attrition mill until substantially all the particles are below 10 microns in size. The ground product is then remixed in a ribbon blender until homogeneous.

The above formulation can be mixed with water and applied as a directed postemergence spray treatment at a rate of 4 kilograms of active ingredient per hectare to bananas.

EXAMPLE 7

5-Chloro-6-methyl-3-neopentyluracil was applied on June 20 to rubber growing in Malaysia in a sandy loam. Numerous annual weeds including *Eleusine*, *Paspalum*, and *Sida* species were controlled for as long as 3 months at the rates of application of 2.2 and 4.4 kg/Ha and there was no crop injury.

EXAMPLE 8

5-Chloro-6-methyl-3-neopentyluracil was applied preemergence to sugarcane and weeds in Hawaii. Diuron was used as a standard for comparison. The results three months after treatment are shown in the table below. No injury to crops was observed.

| Treatment | Rate Kg/Ha | % Weed Control* |
|---|---|---|
| Uracil | 1.1 | 90 |
| | 2.2 | 97 |
| | 4.4 | 100 |
| | 8.8 | 100 |
| Diuron | 2.8 | 90 |
| | 5.5 | 100 |

* Major weeds were sapolo, fireweed, yellow nutsedge, oxalis, winegrass, crabgrass, and ageratum

EXAMPLE 9

5-Chloro-6-methyl-3-neopentyluracil was applied at rates of 1.1, 2.2, 4.4, and 8.8, Kg/Ha preemergence to pineapple and weeds in Hawaii. Four months after application, the 2.2 and 4.4 Kg/Ha rates were still giving good weed control, and there was no crop injury even at the 8.8 Kg/Ha rate.

EXAMPLE 10

5-Bromo-6-methyl-3-neopentyluracil was tested at the rates of 1, 2, and 4 Kg/Ha as a herbicide for bananas in Costa Rica. One Kg/Ha gave excellent control of *Paspalum conjugatum*, *Ixophorus unicetus*, "Camalote" (grass), *Cyperus* sp., *Fleurija aestuans*, *Piper oreatum*, *Pothomorphe peltata*, *Phyllanthus niuri*, and *Euphorbia hirta*. No phytotoxicity was observed on the three varieties tested (Valery, Highgate and Gran Wain).

EXAMPLE 11

5-Chloro-6-methyl-3-neopentyluracil was applied to sugarcane planted in Florida muck soil at the rates of 1.1, 2.2, and 4.4 Kg/Ha. (Diuron and Fenac were included as standards in the test) Two months after treatment the following data were obtained:

| | Rate Kg/Ha | % Weed Control |
|---|---|---|
| 5-Chloro-6-methyl-3-neopentyluracil | 1.1 | 70 |
| | 2.2 | 89 |
| Diuron | 4.4 | 99 |
| Fenac | 9.9 | 100 |

EXAMPLE 12

| | Percent |
|---|---|
| Water | 25.5 |
| Lithium hydroxide, monohydrate | 4.0 |
| Ethylene glycol | 38.5 |
| Methanol | 3.0 |
| Ethanol (denatured with methanol) | 7.0 |
| 5-Chloro-6-methyl-3-neopentyluracil | 22.0 |

The ingredients are combined with stirring in the order indicated to give an aqueous solution.

Four kilograms of the above aqueous solution are diluted with 200 l. of water and applied to a hectare of wine grapes growing in a sandy loam soil in a humid area. The treatment is applied as a directed spray around the base of the vines in early spring using care not to wet more than the base. The treatment controls annual broadleaves and grasses for the entire season and the vines yield a good crop.

I claim:

1. A method of controlling weeds in tropical crops comprising applying to the locus of the crops an effective amount of at least one uracil selected from the group consisting of 5-bromo-6-methyl-3-neopentyluracil and 5-chloro-6-methyl-3-neopentyluracil.

2. The method of claim 1 wherein the crop is tea.

3. The method of claim 1 wherein the crop is coffee.

4. The method of claim 1 wherein the crop is oil palm.

5. The method of claim 1 wherein the crop is sugarcane.

6. The method of claim 1 wherein the crop is grapes.

7. The method of claim 1 wherein the crop is citrus.

8. The method of claim 1 wherein the crop is bananas.

9. The method of claim 1 wherein the active compound is applied in the form of its salt with an alkali metal.

10. The method of claim 1 wherein the active compound is applied in the form of an addition compound with an organic amine selected from the group consisting of ethanolamines, propanolamines, butanolamines, octanolamines, dodecylamines, cocoamine, tallowamine, and piperidine.

* * * * *